Figure 1:
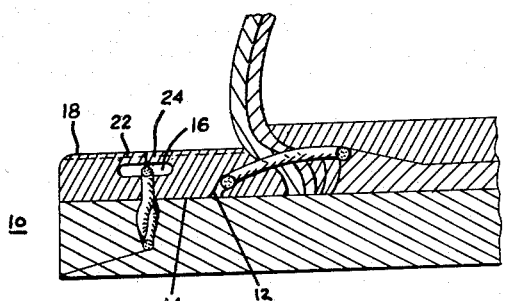

Dec. 10, 1963   J. A. RUBICO   3,113,388
PLASTIC WELT
Filed April 26, 1961

INVENTOR.
JEROME A. RUBICO
BY
Russell, Chittick + Pfund
ATTORNEYS

United States Patent Office 3,113,388
Patented Dec. 10, 1963

3,113,388
PLASTIC WELT
Jerome A. Rubico, Boston, Mass., assignor to Batchelder-Rubico, Inc., Boston, Mass., a corporation of Massachusetts
Filed Apr. 26, 1961, Ser. No. 105,586
1 Claim. (Cl. 36—78)

This invention relates to shoes and more particularly to plastic welts for shoes which welts are adapted for fudge-stitching.

This invention is an improvement on the plastic welt disclosed in my United States Letters Patent, No. 2,922,236. In conjunction with leather welts, it has been customary under the teachings of the prior art to fudge-stitch the welt to the sole in some types of dress shoes. The fudge-stitching involves embedding the upper thread of the lockstitch joining the welt and the sole below the top of the welt. In leather welts this is generally accomplished by first cutting the welt with a knife known as a fudging knife along the desired line of stitching. The fudging knife also spreads the leather and the lockstitch is made with the upper thread located in the cut. Thereafter the cut is closed over the upper thread of the lockstitch completely obscuring it from view.

Plastic welting does not, however, have the characteristics of leather which make fudge-stitching possible without first preparing the plastic welt for fudge-stitching.

My prior invention disclosed producing a longitudinal semicircular passage through the welt located in the proposed line of stitching and adapted merely to receive the stitch. A cut or means of entry was provided between the narrow stitch receiving passage and the upper surface of the welt. The stitching was accomplished by first spreading the cut to expose the passage and then causing the stitches to be made with the upper thread in the passage.

Welting made in accordance with my prior patent has not been wholly satisfactory for fudge-stitching. This has been due to several reasons. First, in fudge-stitching the knife does not run truly parallel to either edge of the welt as originally manufactured. Thus when my prior welt was used, the knife did not always follow the pre-formed cut or entry but deviated from it into the adjacent areas of the plastic. This had several drawbacks. It sometimes caused the knife to slice away portions of the welt along the edge of the cut leaving an unsightly open groove, and it also placed the stitch at the bottom of the newly formed cut which, due to the nature of the plastic material increased the tendency of the stitch to tear through the welt and also caused the material to bulge at that point.

Accordingly it is an object of my invention to provide a plastic welt suitable for use on a shoe when it is desired to fudge-stitch the welt to the sole.

It is a further object of my invention to provide a plastic welt for use on a shoe to be provided with fudge-stitching which welt may be handled with conventional equipment designed for leather welts.

It is yet another object of my invention to provide a plastic welt for use with shoes to be provided with fudge-stitching which will permit deviations in the line of stitching without causing an unsightly condition in the welt.

In the practice of my invention in a preferred embodiment thereof, I construct a plastic welt of usual design. In the process of extrusion of the welt a flattened tubular passage is formed longitudinally within the welting. The passage is located substantially midway between the inner and outer edges of the welt thus formed and lies a slight distance below the upper surface of the welt. The thin layer of plastic between the passage and the upper surface of the welt then remains intact until it is cut during fudge-stitching by conventional tools.

It is a feature of my invention that a plastic welt is formed having a longitudinal internal passage of a width in excess of the normally expected transverse deviations in the line of the stitch, and that prior to fudge-stitching this stitch receiving passage is not open to the upper surface of the welt.

It is a further feature of my invention that fudge-stitching equipment designed for use with leather welts may be used with my plastic welt without alteration.

It is yet another feature of my invention that the welt is cut by the conventional fudging knife just prior to stitching and the knife need not follow a pre-formed cut as was the case with the welt of my prior patent.

Figure 2:
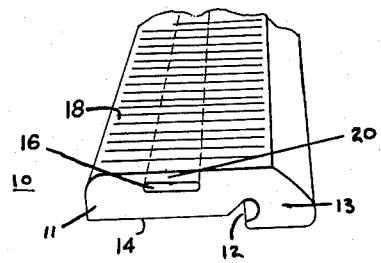

Additional objects and features of my invention will become more apparent as the description proceeds with the aid of the accompanying drawings, in which:

FIG. 1 is a vertical transverse section showing the welt of my invention in place on a shoe; and FIG. 2 is a view in perspective of the welt of my invention prior to stitching.

Having reference now to the accompanying drawings for a more particular description of my invention, I provide a plastic welt indicated generally at 10 having a horizontally extending platform portion 11, an inseam stitch receiving groove 12 and a hinge section 13. The welt 10 is formed by extrusion from a suitable plastics extrusion machine (not shown) and may be formed from any suitable plastic having the necessary characteristics for welting, such as polyvinyl chloride, or neoprene, now widely in use. The groove 12 is formed extending upwardly and inwardly from the undersurface 14 of the welt 10. The groove 12 is provided to receive the inseam stitching.

Also during extrusion an enclosed, internal tubular passageway 16 is formed extending longitudinally through the interior of the welt 10. This is done by conventional extruding techniques. In the preferred embodiment of my invention the welt is 14/32" wide, and the tubular passage 16 is 1/8" wide located midway between the sides of the welt 10. The 1/8" width of the passage 16, which is approximately 30% of the overall width of the welt, is substantially more than is needed to receive the lockstitch and is provided to compensate for deviations in the line of stitching. The passage 16 is approximately 1/64" high and is positioned approximately 1/64 from the upper surface 18 of the welt 10. The welt is approximately 1/8" thick overall.

It will thus be noted that a thin layer or wall 20 of plastic separates the passage 16 from the upper surface 18. It will be further noted that at the completion of manufacture there is no cut or opening between the passage 16 and the upper surface 18 of the welt, and hence the top wall 20 is imperforate.

I have found that the fudge-stitching line normally will not exceed 30% of the width of the welt and therefore the width of the internal passage 16, can, in general, be defined as comprising about 30% of the width of the welt. The actual linear dimension will vary within limits depending on the size of the welt but the percentage of variation remains fairly constant. Another consideration has to do with the bottom wall of the passage 16. It should preferably be horizontal so that the stitch will always rest on a base of a given height regardless of variations in the transverse position of the stitch. In order to provide sufficient material within the platform 11 to hold the stitch, I preferably locate the bottom wall of the passage 16 above the middle of the platform 11. Still another consideration has to do with the thickness of the layer or wall 20. Preferably it is of a thickness sufficient to prevent it from buckling or "running with" the knife. However, the passage 16 should have sufficient height to accommodate the stitch without raising or otherwise deforming the layer or wall 20 above it. Preferably, the vertical dimension of the passage 16 is such that once the stitch has been inserted the lips of the layer or wall 20 will rest on the stitch and be supported thereby in a horizontal position.

The use of my improved welt is as follows:

The welt is first stitched to the upper and the insole by the usual inseaming process. The lower threads of the inseam stitching reside in the groove 12 provided through the bottom 14 of the welt.

The purpose behind fudge-stitching is to provide a means for concealing the upper thread of the lockstitch which joins the welt to the sole, and it is for this purpose that the passage 16 is provided in the welt.

In operation, the fudging knife (not shown) first severs the layer or wall 20 which separates the passage 16 from the upper surface 18 of the welt. This may be easily accomplished with fudging knives customarily used with leather welts since the thickness of the layer or wall 20 is relatively slight. Immediately following the fudging knife, the cut having been spread by the fudging knife, the lockstitch is made, thereby completing the operation. Thereafter the two lips 22 and 24 of the severed layer or wall 20 will realign themselves to provide an appearance of continuity along the surface 18.

It will be noted that by providing a laterally elongated passage 16, substantial deviation may be made from the center line of the welt during operation of the fudging knife and the associated stitching equipment. Since the layer or wall 20 is not pre-cut but is rather cut by the fudging knife immediately ahead of the stitchmaking machinery, the passage 16 is opened only once during the manufacture of the shoe. This results in a much neater appearance due to the fact that no cuts or slices will be made as occurred under the teachings of my prior patent where the welt was first cut and later re-opened for stitching. Since the fudging knife is guided from the outer edge of the welt, which has only been rough rounded at this stage of the manufacture, it is usual for the line of stitching to deviate somewhat from the mid-line of the welt. This normal deviation will not exceed the lateral dimension of the passage 16 as constructed.

It will be understood that the upper surface 18 of the welt may be provided with any suitable decorative marking without interfering with the operation of the invention, and since this surface is unbroken, the decorative marking can be impressed into it without fear of wall collapse along a central line as was the case with the welt of my previous patent.

Since numerous minor variations of the preferred embodiment of my invention will now be apparent to those skilled in the art, it is not my intention to confine the invention to the precise form of the preferred embodiment herein shown.

Having thus disclosed and described a preferred embodiment of my invention what I claim as new and desire to secure by Letters Patent of the United States is:

I claim:

A welt for shoes comprising; a body of resilient plastic material having sides and imperforate top and bottom exposed faces; walls within said body defining a stitch receiving passage longitudinally disposed substantially parallel to and beneath said top exposed face; said passage having a horizontal dimension substantially exceeding its vertical dimension; said passage being located substantially midway between the sides of said welt; and a substantially flat bottom wall parallel to the bottom exposed face of said welt, said bottom wall being spaced from said bottom exposed face by a distance sufficient to provide adequate resilient material to hold stitches.

References Cited in the file of this patent

UNITED STATES PATENTS

| | | |
|---|---|---|
| 1,695,969 | Lyon | Dec. 18, 1928 |
| 2,922,236 | Rubico | Jan. 26, 1960 |

FOREIGN PATENTS

| | | |
|---|---|---|
| 959,444 | Germany | Mar. 7, 1957 |